COMPOSITIONS, COATING OR PLASTIC.
106/86
March 23, 1937.  L. N. REYNOLDS  2,074,758
COMPOSITION FOR FLOORS AND THE LIKE
Filed Dec. 16, 1935
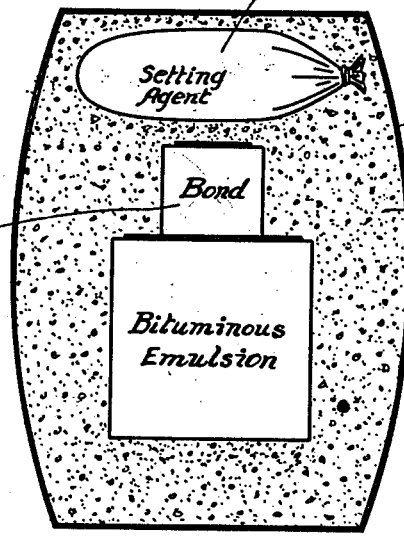
P.C. or gypsum flour or silica "
an asphalt to be rendered fluid by heat
Granular ingredient } highly cellular burned clay ("Haydite")
INVENTOR.
Lloyd N. Reynolds
BY
Bates, Goldrick & Teare
ATTORNEYS.

COMPOSITIONS,
COATING OR PLASTIC.

Patented Mar. 23, 1937

2,074,758

UNITED STATES PATENT OFFICE 2,074,758

COMPOSITION FOR FLOORS AND THE LIKE

Lloyd N. Reynolds, Cleveland, Ohio, assignor to Maintenance Research, Limited, Cleveland, Ohio, a limited partnership association of Ohio Application December 16, 1935, Serial No. 54,535

7 Claims. (Cl. 106—24)

The principal object of this invention is to provide a plastic flooring or surfacing composition having advantages over prior practice in respect to facilitating the application of the flooring to various types of supporting surfaces and in respect to toughness, strength, etc., resistance to cracking during setting and resistance to subsequent deterioration in use.

A further object is to provide a plastic flooring composition which will be much lighter in weight than flooring compositions of the so-called mastic type previously known or used; which will have high thermal insulative value; may be easily and quickly applied on a supporting surface by unskilled workmen, and which may be put into service within a few hours after application to the supporting surface.

An important object is to provide a composition for floors and the like, including a bituminous emulsion, a setting agent and an aggregate material, wherewith unusually good results are obtained, notwithstanding the use of less expensive grades or types of emulsion than ordinarily used for such purposes.

A further object is to provide a flooring composition having an asphalt base and an aggregate, which composition may be put into place and given substantially a final finish while still plastic without danger of subsequent cracking, even though no superficial drying retarding means or expedients are used.

A still further object is to provide a plastic flooring composition which, when properly applied, will result in a floor having unusual wearing and corrosive resisting qualities.

A further object is to provide a novel system of applying the ingredients to make a plastic flooring, whereby the user, by following a few simple directions, may always be certain to obtain good results, thereby eliminating the hazard incident to buying part of the material from one source and part from another source, which materials may not be suited to each other because of containing impurities not supposed to be there.

Still another object is to provide an improved way of packaging materials for flooring compositions and the like, which materials include an aqueous emulsion.

The accompanying drawing is a diagram showing an improved way of packaging the ingredients of the composition for shipment.

The composition hereof employs three basic ingredients, namely, a bituminous aqueous emulsion of say commercial asphalt, a setting agent, and an aggregate. The bituminous ingredient is preferably an aqueous emulsion, in which the bituminous matter comprises the internal phase. An emulsifying agent such as colloidal clay, (bentonite e. g.) or other emulsifying agent, such as soap, is used and the emulsion may contain fibrous material of any sort to toughen the bituminous body when de-emulsified. Suitable emulsions are described in the patents to L. Kirschbraun, 1,506,371, August 26th, 1924, 1,620,899, March 15th, 1927 and Reissue 16,328, April 20th, 1926.

The setting agent preferably comprises a good grade of Portland cement containing no free alkalinities, preferably in particles which will pass say approximately 160-mesh screen. In selecting the cement, the so-called slag-prepared cements are avoided, because these are apt to contain free lime and other alkalinities. Such free alkalinities have been known to exert destructive action on commercially available asphalt emulsions carrying alkalinities of their own, causing the asphalt to "burn out", and lose its adhesive qualities. It follows that the emulsion itself should, for the above reasons, be neutral and, if not, slightly acid rather than alkaline.

Further examples of setting agents, comprise gypsum flour and silica flour. Other specially prepared cements, such as Incor and Hydocal may be used. The Portland cement, which I recommend, has an approximate expansion value of 45 ten millionths of an inch.

I propose to use as the aggregate crushed granules of a material obtainable on the market under the name "Haydite". This is a highly cellular burned argillaceous product, made substantially in accordance with the patent to S. J. Hayde, 1,707,395, issued April 2nd, 1929. As prepared, the raw material, such as blue shale, is put into a rotary kiln having an initial effective temperature in excess of 1500 degrees Fahrenheit, usually about 2200 to 2700 degrees F. This treatment, as against the usual slow building up of temperature in a clay-burning kiln, results in exploding the body to form densely distributed cells therethrough and the treatment is maintained long enough to burn out the organic matter and drive out substantially all water leaving the cells uncommunicating, and the clay body burned to extreme hardness, but without vitrification to any great extent. The material issues from the kiln in the form of clinkers, which are then crushed and graded. All of the material, including the fines, may be used in the composition hereof.

The size of the aggregate to be used in the floor composition is determined principally by the thickness of the layer thereof desired, and whether or not feather edging is necessary in laying the floor. In general, the size of aggregate may be increased as the thickness of the floor layer desired is increased, and, in the event of feather edging, very fine particles of aggregate are recommended for that portion of the coating incorporating the feather edge. The invention is not confined to any particular size of aggregate, but, for example, commercial Haydite from ½" down to a fine powder is suitable. The fine and coarser particles are preferably used together.

Referring further to the peculiar material, Haydite, the crushed particles, have rough and pitted exterior surfaces, and an internal cellular structure, the cells of which do not, in general, communicate, except at the surface, where one cell is broken into another in the crushing of larger pieces. The material is not water absorptive, because of porosity, as is the usual burned clay. The material is, as stated above, extremely hard, and when local crushing pressure is applied to a granule thereof, some of it goes substantially to a powder and the remainder of the granule remains intact. Innumerable cavities with overhanging walls are thus presented to the binder material for interlocking with the same.

The material, Haydite, is, moreover, chemically inert, as distinguished from sand and ordinary rock aggregates, which are generally termed "live aggregates". The expansion value of Haydite lies in the neighborhood of 45 ten millionths of an inch, and it is noted that this is substantially the same as the expansion value of the Portland cement. There is absolutely no chemical reaction between the Portland cement and the Haydite, and this fact, together with the unity of expansion values between the two, makes the composition unsually stable. There is, moreover, no chemical reaction between the Haydite and the bituminous emulsion. "Live aggregates", such as ordinary sand, gravel and crushed rock, have an expansion value of approximately 82 ten millionths and contribute materially to the cracking experienced in connection with mastic floors and other surfaces, not only because of the difference in expansion value of the aggregate, as compared with that of Portland cements, but also due to the chemical reaction between impurities contained in such live aggregates and the Portland cement.

In addition to the other characteristics of Haydite, mentioned, the material weighs about 1600 pounds per cubic yard, as against the weight of ordinary rock aggregates (approximately 2400 pounds per cubic yard). Consequently, a great saving is effected in shipping and handling cost. The weight, of course, varies in accordance with the fineness of the granules.

The granules can be used in sufficient proportion with respect to the plastic binder, as to lie in contact with each other, thereby resisting local indentation and spreading of the composition in service. The granules are, however, fully enveloped by the plastic binder.

The materials of the composition may be supplied to the consumer in suitable packages, as bags, drums or barrels, suited to the different ingredients. For example, the aggregate (Haydite e. g.) and setting agent may be supplied in bags or packages containing, separately in smaller packages, the proper amount of setting agent, and the bituminous emulsion (and bonding material, where used) separately packed in suitable drums or cans. An improved way of supplying the ingredients, however, is as shown in the drawing, wherein a single package such as a barrel I contains the granular ingredient or aggregate material and separate packages for the bituminous emulsion, setting agent and bonding material are contained within the barrel with the aggregate. The bituminous emulsion (and bond, when used) are placed in very inexpensive containers and embedded in the granular material so that a continuous thermal insulative envelope of aggregate lies between the container or containers and the wall of the barrel on all sides. Thus the aggregate not only insulates the emulsion against the effects of reduced temperatures tending to freeze the water content of the emulsion during shipment or handling, but also reinforces the container or containers so that these may be much less strongly made than when they are to be shipped separately. The particular aggregate used has unusually high insulating values, due to the cellular construction of the granules.

It is to be understood that the amounts of aggregate, emulsion, setting agent (and bond, when required) are always supplied in the unit shipment in the proper proportion so that the consumer has just enough and no more of each ingredient. Regarding the bonding material, this may comprise an asphalt emulsion or asphalt in any other form, say adapted to be rendered fluid by heat, etc., but as the bonding material is simply a substratum to provide a clean, adherent coating for the principal ingredients of the composition, the character of the bonding material may vary greatly. In some cases the bond material may be omitted, because the emulsified asphalt has the essential bonding properties to serve under ordinary conditions.

Simple printed directions accompany each individual shipment, and these contain precautionary measures to be taken under ordinary conditions, such as cleaning and conditioning of supporting surfaces, optimum temperature and humidity, the provision of depth strips where necessary, and in respect to filling holes, and providing a solid base on which to work. The workman is instructed by the directions to first apply the bonding material over the cleaned floor surface and wet it down, using water that is, as far as practicable, free from salt, sulphur and alkali. The plastic bond material is scrubbed into the pores of the surface and left to dry during the procedure of mixing the ingredients of the composition. The mixing thereof is accomplished as follows:

The granular aggregate and the setting agents are first mixed together very thoroughly dry. The necessary amount of water is then added to the mixture to bring it to the consistency of concrete mortar, and the emulsified asphalt is then added, being very thoroughly mixed therewith. The result is then dumped onto the prepared surface between the depth strips (when used), levelled off and worked down with a wooden float or steel trowel, and then allowed to set and dry. Setting and drying takes place within from thirty-six to forty-eight hours and the material becomes tougher and harder as time goes on. No superficial retarding expedient is necessary, in order to prevent cracking during the setting and drying period, principally because the excess moisture is retained by the aggregate and other materials and given up slowly after the surface of the application is dry and the floor is, in fact, ready for normal service.

The action of the setting agent is principally to quickly absorb sufficient moisture from the emulsion so as to assume an initial setting and the removal of this water allows the asphalt particles to coalesce or set. The aggregate particles perform the important function of drawing all excess water into the myriads of surface cells (really pockets) which are too small to have become even partially filled with the relatively viscous emulsion. The setting agent never takes a final setting because of the water-proofing action of the asphalt when de-emulsified. The fibrous materials, when used, toughen the bituminous body and further retain excess moisture for a considerable period and give it up slowly.

The following proportions by volume of setting agent, bituminous emulsion and Haydite, are given by way of examples that have been found satisfactory:

| Setting agent | Bituminous material | Aggregate |
|---|---|---|
| Part | Parts | Parts |
| 1 | 2 | 5 |
| 1 | 2 | 6 |
| 1 | 2 | 7 |
| 1 | 2 | 8 |
| 1 | 2 | 9 |
| ½ | 2 | 5 to 9 |

Further, as a general rule, the composition may comprise from ½ to 1½ parts of Portland cement or other setting agent, 1½ to 3 parts of asphalt emulsion, and from 5 to 12 parts of Haydite.

It is to be understood that, in the above examples, any one of the essential ingredients may be increased or diminished to a reasonable extent with respect to the other ingredients, having in mind that the aggregate content should not be increased to such extent that the granules will be to any extent uncoated by the plastic content, or the setting agent increased to such a point that the result becomes brittle.

It will be noted that the proportion of aggregate is unusually high for a flooring composition and this is entirely practicable for the following reasons: Ordinarily, as mentioned above, chemical reactions are set up in the presence of water between the impurities in the "live aggregate" materials and the setting agent. These reactions cause shrinkage of the setting agent beyond the normal shrinkage incident to initial setting thereof. Consequently, a materially larger percentage of asphalt or plastic body material is ordinarily essential to absorb the shrinkage. Because of such usual employment of a larger percentage of asphalt (in proportion to the aggregate content) a higher grade asphalt must be used (harder) in order to secure satisfactory stability and wearing qualities. A hardness of below 50 penetration is ordinarily recommended. The use of a chemically inert aggregate, having the same expansion values as the setting agent and having the necessary hardness for wear, permits the practical use of lower percentages of bituminous emulsion of softer and hence less expensive grades than are ordinarily found suitable. I can use, for example, asphalt of as high as 150 penetration with good results in one or more of the exemplary proportional relationships above given.

The composition is not, of course, confined to use in preparing floors, although that is the principal purpose for which intended.

I claim:

1. A flooring composition, comprising one-half to one and one-half parts of a powdered setting agent selected from the group containing Portland cement, gypsum flour and silica flour, from one and one-half to three parts of emulsified bituminous material, and from five to twelve parts of highly expanded, burned and inert argillaceous material in granular form.

2. A flooring composition, comprising one-half to one and one-half parts of Portland cement, one and one-half to three parts of emulsified asphalt and five to twelve parts of Haydite.

3. A flooring composition, comprising a mixture of from five to twelve parts of expansively burned argillaceous material, in rough granular form, from one and one-half to three parts of bituminous material in the form of an aqueous emulsion and from one-half to one and one-half parts of a powdered setting agent capable of taking an initial setting in the presence of water.

4. A composition of the class described, comprising a mixture of crushed, argillaceous material, which has been burned to expand it, so that the exterior surfaces of the granules are rough and pitted and the interior portions of the individual granules have a multiplicity of substantially discommunicated cells throughout the same, said composition containing an aqueous emulsion wherein particles of bituminous matter are dispersed in an external phase of water, and a setting agent adapted to take an initial setting in the presence of the water furnished by said external phase.

5. A composition of the class described, comprising a bituminous emulsion, and a filler comprising burned argillaceous granules, said filler including a setting agent which becomes active to remove the water from the emulsion whereby the composition takes an initial setting.

6. A flooring composition, comprising an aqueous emulsion of bituminous materials, a setting agent adapted to acquire setting by combining with water from the emulsion, and a granular burned argillaceous material in a volume larger than both aforesaid ingredients, expanded to produce therein a multiplicity of relatively small cells, the granules being broken from larger pieces so as to present rough external pocketed surfaces.

7. A composition of the class described, comprising a bituminous emulsion, a setting agent and an aggregate which is inert with respect to the setting agent and has substantially the same expansion value as the setting agent, whereby the composition is unlikely to shrink and the softer grades of bituminous emulsions may be used effectively.

LLOYD N. REYNOLDS.